Figure 1:
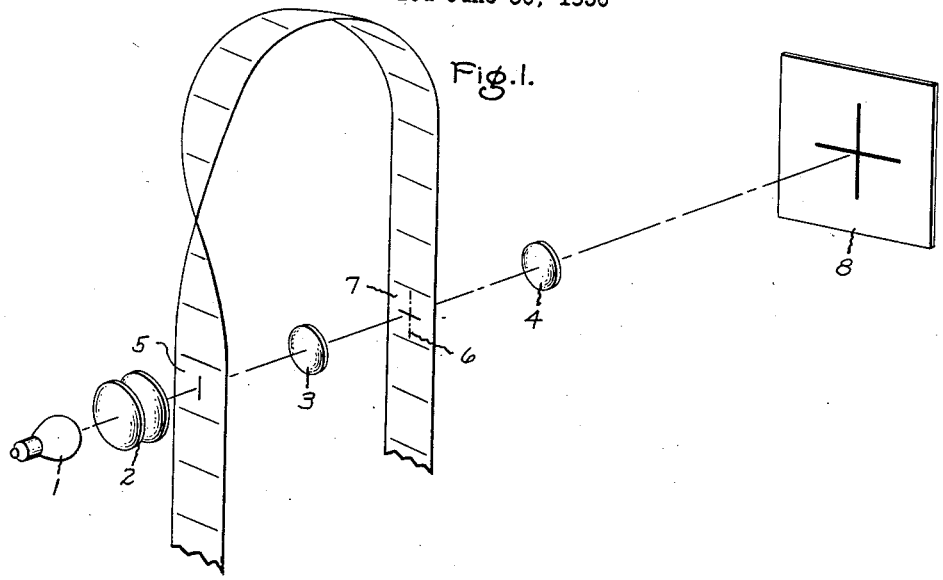

June 12, 1951  W. J. DEGNAN ET AL  2,556,871
SUPERPOSITION OPTICAL IMAGE PROJECTOR
Filed June 30, 1950

Inventors:
William J. Degnan,
Clarence J. Kettler,
by Ernest H. Britton
Their Attorney.

Patented June 12, 1951

2,556,871

UNITED STATES PATENT OFFICE

2,556,871

SUPERPOSITION OPTICAL IMAGE PROJECTOR

William J. Degnan, Pittsfield, and Clarence J. Kettler, Stockbridge, Mass., assignors to General Electric Company, a corporation of New York Application June 30, 1950, Serial No. 171,431

1 Claim. (Cl. 88—24)

This invention relates to projecting equipment for photographic film, and more particularly to a projecting device which will project two photographic films simultaneously onto a single screen using only a single light source.

In the photographic analysis of certain phenomena, it often becomes desirable to compare several photographic films with one another. For example, in work with electrical oscillographs, it is often helpful in the analysis of electrical wave characteristics to be able simultaneously to project two oscillograms onto a single screen for direct comparison.

It has been known in the past to project two photographic films onto the same screen by means of separate projectors. The basic difficulty of such a system is that the transmitted light from the first film will bleach out the dark lines coming from the second film and vice versa, resulting in an image of such low contrast that it is impossible to use. The only solution to the problem is to have a single light source which passes through one film and then through the next.

Furthermore, it usually happens that the two photographic films which it is desired to compare will be on the same roll or strip of film, perhaps being closely spaced or perhaps being separated from one another by many feet of film. Consequently, it is desirable that the projection system used be one which can conveniently compare two films on the same film strip, whether the films to be compared are closely spaced or are separated by a considerable distance from one another on the strip.

Accordingly, it is an object of this invention to provide a projection system for simultaneously projecting two photographic films onto a single screen using only a single light source.

It is a further object of this invention to provide a projection system for comparison of two photographic films on the same film strip which can be accomplished without cutting or splicing operations.

In accordance with these objectives, this invention provides a projection system for photographic film utilizing a single light source, in which the optical system is so arranged that a real image of a first photographic film is formed by a first lens and is picked up and projected by a second lens. The second photographic film is positioned in the same plane as the real image of the first film so that the second lens will project both the real image of the first film and also the second film onto a suitably placed screen or photographic plate.

The features of this invention which we believe to be novel are set forth with particularity in the appended claim. Our invention itself, however, both as to its organization and use, together with further objects and advantages thereof, may best be understood by reference to the following description taken in connection with the accompanying drawing in which Fig. 1 is a schematic drawing illustrating the physical principles upon which our superposition projector is based, and in which Fig. 2 is an embodiment of our invention in a superposition projector using a modified optical system based upon the same principles as the system of Fig. 1, but permitting comparison of closely spaced images without appreciable translation or bending of the common film base.

Figure 2:
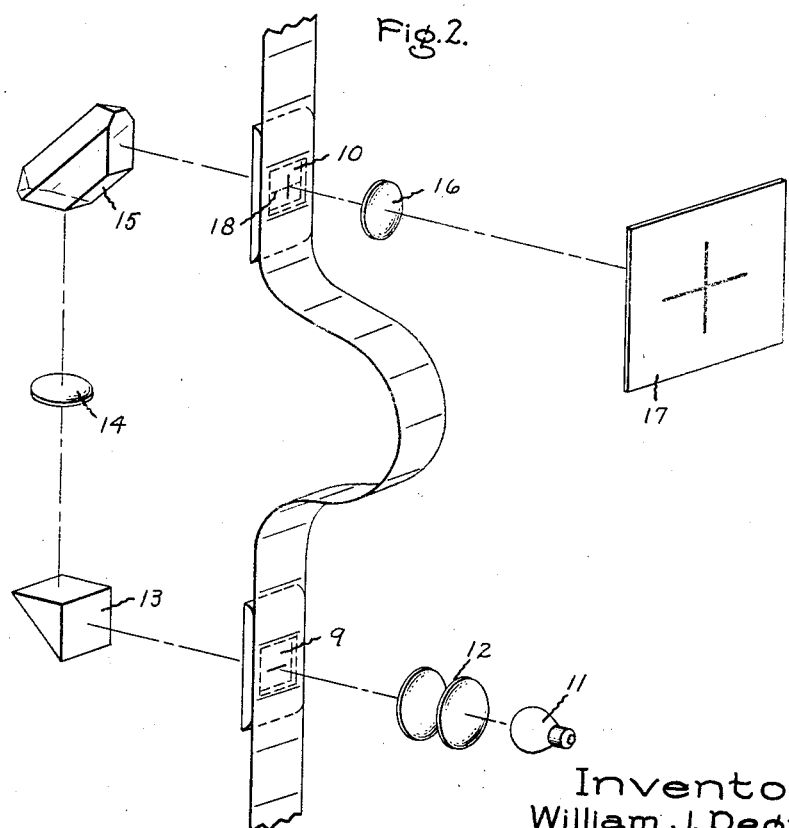

Referring now to the drawing, there is shown in Fig. 1 a projection lamp 1, a condensing lens 2, a first convergent lens 3, and a second convergent lens 4, all on a mutual axis. The function of the condensing lens 2 is to converge the light rays from the projection lamp 1 toward the center of lens 3. A film 5 is positioned between condensing lens 2 and convergent lens 3 with film 5 being beyond the first focal plane of lens 3. The light passing through the film and through lens 3 causes an inverted real image 6 of film 5 to be formed on the other side of lens 3.

A second film 7, which may be on the same film strip as film 5 and separated from film 5 by a film strip distance which may range from a very short length to infinity, is positioned in the same plane as the inverted real image 6 of film 5. As a result, second convergent lens 4 projects both the projected real image 6 of film 5 and also the image of film 7 onto screen or photographic plate 8 which is positioned on the other side of lens 4. Lens 4 is positioned at a distance from film 7 and real image 6 greater than the focal length of lens 4.

Since the two film images to be compared are both on the same strip of film, it is necessary that the film strip assume a U-shape, as shown in Fig. 1, in order to line up both films 5 and 7 with the optical axis.

Due to the inversion of film 5 by lens 3, the real image 6 of film 5 has both its top and bottom and left and right coordinates reversed with respect to the original orientation of film 5.

In order that there be a proper superposition of films 5 and 7 it is, of course, necessary that the superposed images have the same relative orientation of top and bottom and left and right coordinates. The top and bottom coordinates of film 7 are properly oriented with respect to real image 6 due to the U-shape of the film strip. In order to obtain proper left and right orientation of film 7, it is necessary to give the film strip a 180 degree twist. The combination of the U-shape and the 180 degree twist orients film 7 so that both its top and bottom and left and right coordinates are oriented in the same manner as the corresponding coordinates of real image 6 of film 5.

There is shown in Fig. 2 a modified embodiment of our invention with an optical arrangement which eliminates the necessity of aligning all of the optical components on the same axis, as in the arrangement of Fig. 1, and thereby achieves a more compact and flexible assembly than that of Fig. 1.

The arrangement of Fig. 2 avoids the necessity of having a 180 degree film twist for proper image orientation, as is the case in the arrangement of Fig. 1, and also provides other advantages which will be explained hereinafter.

Referring now to Fig. 2, there is shown a projection system for comparing two films 9 and 10 both lying on the same film strip. This projection system includes a projection lamp 11, a condensing lens 12, a right-angle prism 13, a first convergent lens 14, an Amici roof prism 15, a second convergent lens 16, and a screen or photographic plate 17. The projection lamp 11, the condensing lens 12, and the film 9 all lie on a mutual axis which is perpendicular to an axis defined by right-angle prism 13, first convergent lens 14 and Amici roof prism 15. The second film 10, the second convergent lens 16, and the screen or photographic plate 17 all lie on a mutual axis perpendicular to the axis on which convergent lens 14 lies, and, consequently, on an axis parallel to the axis of projection lamp 11, condensing lens 12, and film 9.

Condensing lens 12 converges the light rays from the projection lamp 11 toward the film 9, the right angle prism 13, and the first convergent lens 14. Right-angle prism 13 bends the light rays which have passed through film 9 so that they are perpendicular to their original direction and pass along the axis of convergent lens 14. Convergent lens 14 causes an inversion of the light rays passing through it so that the transmitted image of film 9 after leaving lens 14 has its top and bottom and left and right coordinates reversed with respect to the corresponding coordinates of film 9.

Since the ultimate objective of the optical system is to compare the transmitted image 18 of film 9 with film 10, it is necessary that the transmitted image of film 9 have the same ultimate orientation as film 10.

To obtain this necessary orientation of the image 18 of film 9 which has been transmitted through right-angle prism 13 and lens 14, it is necessary to reverse the top and bottom and left and right coordinates of the image as it appears after leaving lens 14.

In order to obtain such an image orientation, we use the well known Amici roof prism 15 which simultaneously bends light rays through a 90 degree angle and, at the same time, inverts the image by reversing its top and bottom and left and right coordinates.

The Amici roof prism 15 is placed at the intersection of the axes defined by prism 13 and lens 14, on the one hand, and film 10 and lens 16, on the other hand. Thus the inverted real image transmitted by lens 14 is bent through 90 degrees and re-inverted by Amici roof prism 15, and brought to a focus in the same plane as film 10. Lens 16 picks up light rays from the transmitted real image 18 of film 9 and also from film 10 and projects a resultant image of both films 9 and 10 onto screen 17.

A further advantage resulting from the use of the optical arrangement of Fig. 2 is that it permits the use of a lens 14 having a long focal length, and a lens 16 of a reasonable aperture. To keep the lens 16 within a reasonable aperture, it is necessary to decrease the included angle of the rays from lens 14. For a given size of image 9 or 10 it is, therefore, necessary to increase the focal length of lens 14. The optical system of Fig. 2 makes it possible to accommodate the longer focal length of lens 14 and still pick up closely spaced film images 9 and 10. Furthermore, the arrangement of lens 14 and prisms 13 and 15 along a mutual axis which is perpendicular to the axis of lens 16 provides a self-contained sub-assembly which permits accurate ratio adjustments of the images of films 9 and 10 and which also permits accurate focusing of the image of film 9 with relation to film 10 without in any way interfering with any mechanical translation equipment which may be used to obtain a desired degree of offset between the two superimposed images.

In both the system of Fig. 1 and that of Fig. 2, any suitable means may be used to shift the film images slightly so as to obtain any desired degree of offset between the projected images.

It can be seen that in the embodiment of our invention provided in Figs. 1 and 2, we provide a convenient and efficient optical system for projecting two film images onto a single screen or photographic plate using a single light source.

While there have been shown and described particular embodiments of our invention, it will be obvious to those skilled in the art that various changes and modifications can be made therein without departing from the invention and, therefore, it is aimed in the appended claim to cover all such changes and modifications as fall within the true spirit and scope of the invention.

What we claim as new and desire to secure by Letters Patent of the United States is:

A film projection system for simultaneously projecting two film images for comparison comprising a light source, a condensing lens and a first film all lying on a first axis, light from said light source first passing through said condensing lens and then through said first film, a first convergent lens lying on a second axis perpendicular to said first axis, a right-angle prism lying at the intersection of said first and second axes, said right-angle prism bending said light rays from said light source so that they pass along said second axis and through said first convergent lens, said first convergent lens inverting the light rays passing therethrough with respect to their original orientation, a second convergent lens lying on a third axis perpendicularly to said second axis and parallel to said first axis, an Amici roof prism lying at the intersection of said second and third axes, said Amici roof prism bending said light rays emerging from said first convergent lens through 90 degrees so that they pass along said third axis, said Amici roof prism also re-inverting the orientation of said light rays to compensate for the inversion produced by said first convergent lens, a real image of said first film being formed along said third axis between said Amici roof prism and said second convergent lens, a second film lying on said third axis in the same plane as said real image of said first film, said second convergent lens projecting said second film and also said real image of said first film in superposed relation so as to permit comparison of said first and second films.

WILLIAM J. DEGNAN.
CLARENCE J. KETTLER.

REFERENCES CITED

The following references are of record in the file of this patent:

UNITED STATES PATENTS

| Number | Name | Date |
| --- | --- | --- |
| 1,690,584 | Jones | Nov. 6, 1928 |
| 1,947,668 | Warmisham | Feb. 20, 1934 |
| 1,959,498 | Planskoy | May 22, 1934 |
| 2,148,814 | Ionesco et al. | Feb. 28, 1939 |
| 2,406,451 | Borkenstein | Aug. 27, 1946 |